(12) United States Patent
Viitala et al.

(10) Patent No.: US 10,728,182 B2
(45) Date of Patent: Jul. 28, 2020

(54) METHOD AND TECHNICAL EQUIPMENT FOR AUTOMATIC NOTIFICATION GENERATION

(71) Applicant: M-Files Oy, Tampere (FI)

(72) Inventors: Hannu Viitala, Tampere (FI); Antti Nivala, Pirkkala (FI)

(73) Assignee: M-FILES OY (FI)

( * ) Notice: Subject to any disclaimer, the term of this patent is extended or adjusted under 35 U.S.C. 154(b) by 188 days.

(21) Appl. No.: 15/823,738

(22) Filed: Nov. 28, 2017

(65) Prior Publication Data

US 2018/0131646 A1    May 10, 2018

Related U.S. Application Data

(63) Continuation-in-part of application No. 13/927,622, filed on Jun. 26, 2013, now abandoned.

(51) Int. Cl.
*H04L 12/58*    (2006.01)

(52) U.S. Cl.
CPC ................... *H04L 51/02* (2013.01)

(58) Field of Classification Search
CPC ....... G06Q 10/06; G06Q 10/103; H04L 51/02
See application file for complete search history.

(56) References Cited

U.S. PATENT DOCUMENTS

| 2003/0088534 A1* | 5/2003 | Kalantar | ................ G06Q 10/06 706/50 |
| 2009/0182610 A1 | 7/2009 | Palanisamy et al. | |
| 2011/0060767 A1* | 3/2011 | Agarwal | ............. G06F 17/2247 707/803 |
| 2012/0131426 A1* | 5/2012 | Oyarzabal | ............... G06F 17/21 715/200 |
| 2012/0131445 A1 | 5/2012 | Oyarzabal | |
| 2013/0110943 A1 | 5/2013 | Menon et al. | |
| 2014/0180938 A1 | 6/2014 | Domke et al. | |

* cited by examiner

*Primary Examiner* — Shean Tokuta
(74) *Attorney, Agent, or Firm* — Ware, Fressola, Maguire & Barber LLP

(57) ABSTRACT

The invention relates to a method, comprising detecting a notifiable operation concerning an electronic object; automatically generating a notification relating to the detected operation; wherein the generating comprises creating the notification at least from data that is a metadata value of such electronic object that is a target of an indirect reference chain, which chain starts from the electronic object in question sending electronically the generated notification to a relevant user. The invention relates also to an apparatus and a computer program product. The invention may be utilized in a document management system.

18 Claims, 7 Drawing Sheets

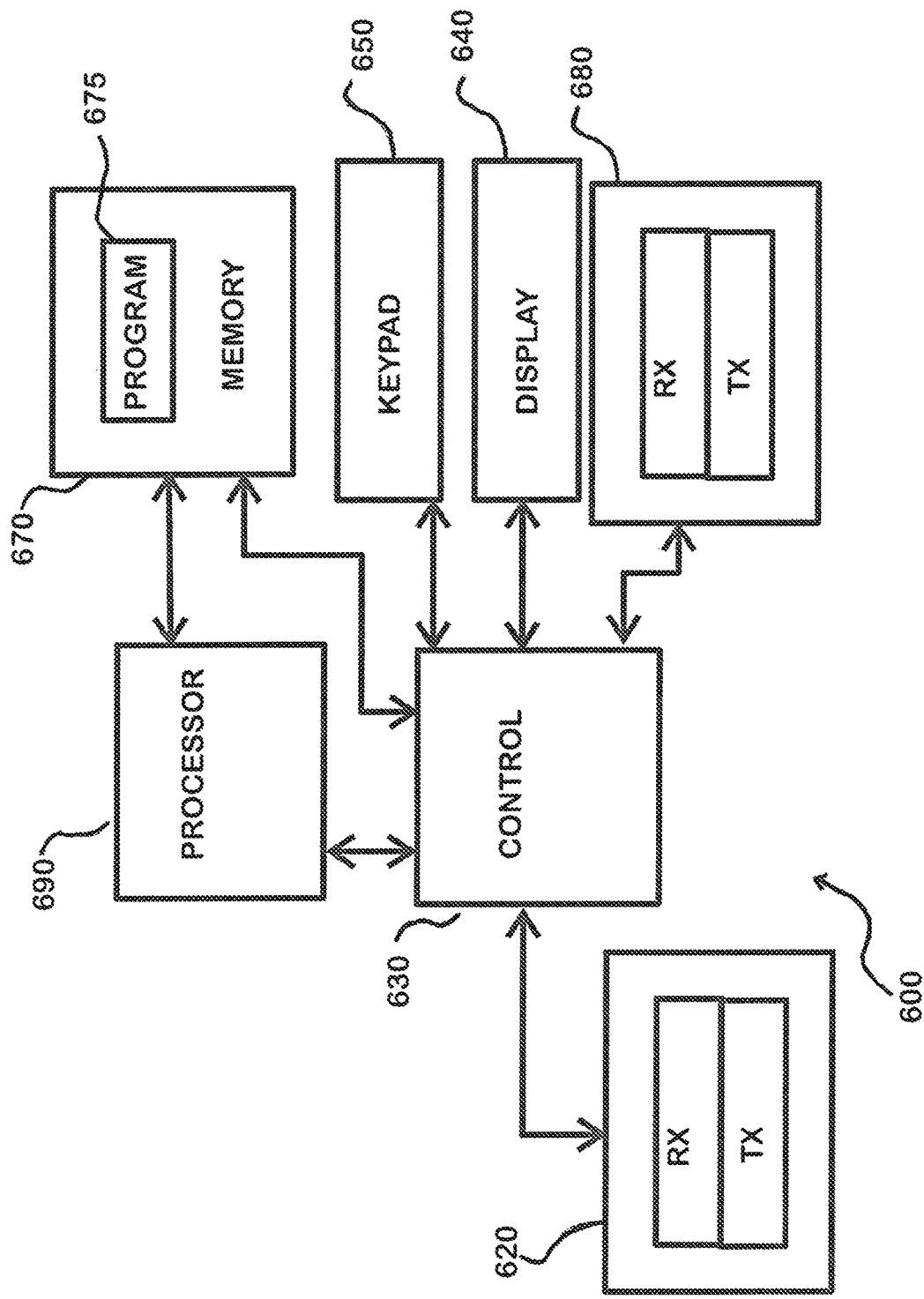

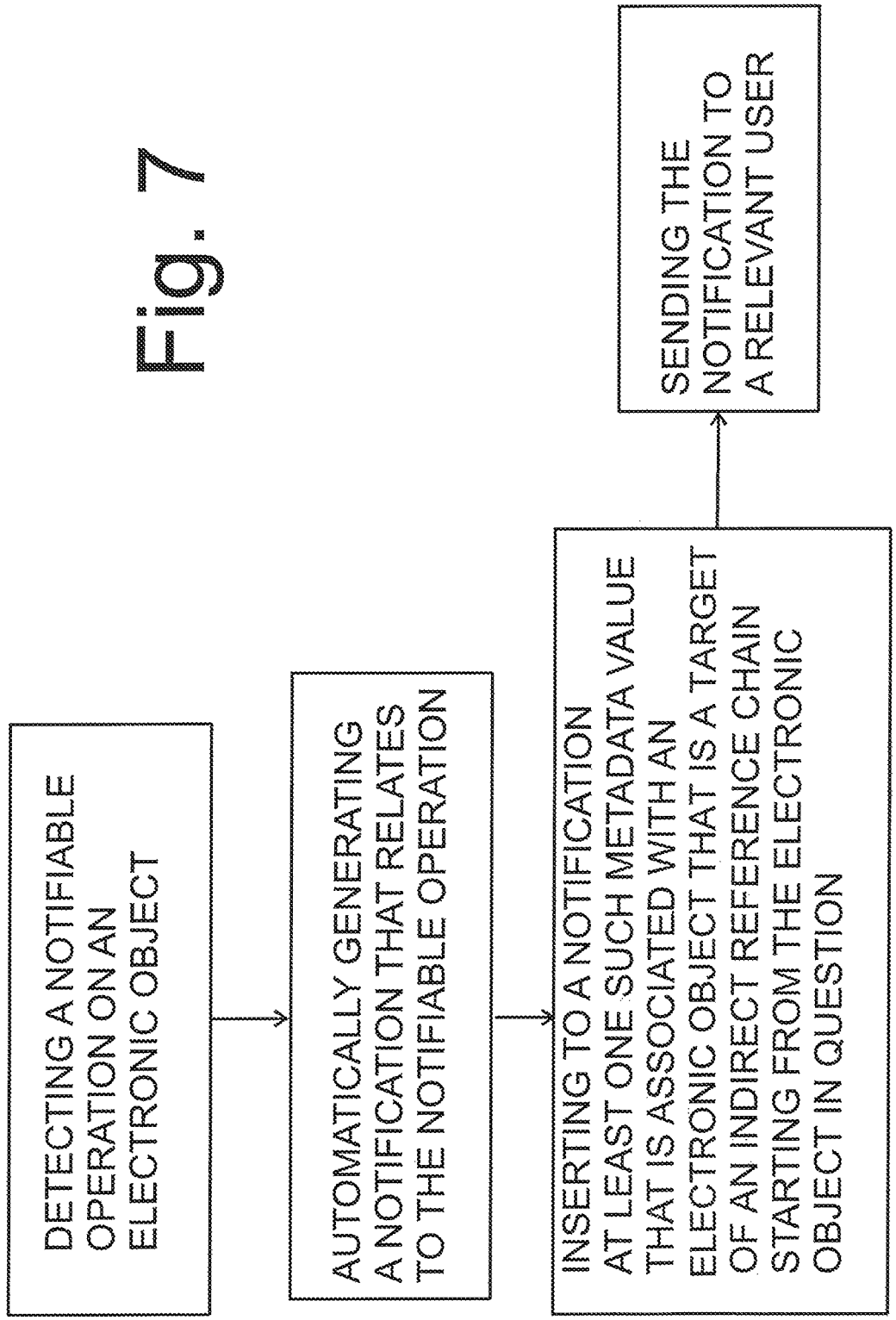

METHOD AND TECHNICAL EQUIPMENT FOR AUTOMATIC NOTIFICATION GENERATION

CROSS-REFERENCE TO RELATED APPLICATION

This application is a continuation-in-part of co-pending patent application Ser. No. 13/927,622 filed on Jun. 26, 2013. This continuation-in-part application is claiming domestic priority under all applicable sections of 35 U.S.C. § 120.

TECHNICAL FIELD

The present application relates to a method, an apparatus and a computer program product for automatic notification generation.

BACKGROUND

Electronic messaging (e.g. emailing, short messaging, instant messaging) has become one of the most used communication methods of today. Typically electronic messaging comprises creating a message manually by inputting text into a message, defining to whom the message is to be sent and then sending the message to the recipient. The recipient's contact information depends on the communication method, for example an email address is typically formed of local part and domain part being separated by the "@"-sign and a short messaging is targeted to the recipient's telephone number.

In addition to manual generation of messages, electronic messages can be generated automatically. A well-known example of an automatic message is an out-of-office automatic reply message which is generated as a response to a received message when the recipient is out-of-office. Such an automatic message can be pre-defined by a user. In some cases also a messaging system can generate automatic messages—for example when a recipient address cannot be solved (resolved) and the message cannot be transmitted.

Today's data management systems and/or data workflow systems are also able to generate automatic messages (i.e. notifications) on actions performed in the system. For example, when a certain state has been reached (i.e. certain action has been finished) in the workflow, a relevant user is notified of that with an automatically generated notification. The message may have a system specific template, which is completed with relevant information, e.g. file name, user data and occurred action. However, known systems are only able to use such information that is directly obtainable from the file in question.

There is, therefore, a need for a solution that expands the automatic generation of notifications in such a manner that also data that is not directly related to the file can be used as content of the notification.

SUMMARY OF THE INVENTION

Now there has been invented an improved method and technical equipment implementing the method, to address such a need. Various aspects of the invention include a method, an apparatus and a computer readable medium comprising a computer program stored therein, which are characterized by what is stated in the independent claims. Various embodiments of the invention are disclosed in the dependent claims.

According to a first aspect a method comprises detecting a notifiable operation concerning an electronic object; automatically generating a notification relating to the detected operation; wherein the generating comprises creating the notification at least from data that is a metadata value of such electronic object that is a target of an indirect reference chain, which chain starts from the electronic object in question; and sending electronically the generated notification to a relevant user.

According to a second aspect, an apparatus comprises at least one processor, memory including computer program code, the memory and the computer program code configured to, with the at least one processor, cause the apparatus to perform at least the following: detecting a notifiable operation concerning an electronic object; automatically generating a notification relating to the detected operation; wherein the generating comprises creating the notification at least from data that is a metadata value of such electronic object that is a target of an indirect reference chain, which chain starts from the electronic object in question; and sending electronically the generated notification to a relevant user.

According to a third aspect, a computer program product embodied on a non-transitory computer readable medium, comprises computer program code configured to, when executed on at least one processor, cause an apparatus or a system to: detect a notifiable operation concerning an electronic object; automatically generate a notification relating to the detected operation; wherein the generating comprises creating the notification at least from data that is a metadata value of such electronic object that is a target of an indirect reference chain, which chain starts from the electronic object in question, send electronically the generated notification to a relevant user.

According to an embodiment, the notifiable operation is an operation that needs to be informed to the relevant user in order to keep the object in process.

According to an embodiment, the notifiable operation is one of the following: a new object in a workflow, a state transition of an object, and a new assignment concerning the object.

According to an embodiment, the relevant user is determined from the metadata of the electronic object.

According to an embodiment, the relevant user is determined from the metadata of such electronic object that is a target of an indirect reference chain, which chain starts from the electronic object in question.

According to an embodiment, the relevant user is pre-defined for the notifiable operation.

According to an embodiment, the notification is sent by means of following methods: email, short messaging, instant messaging, an electronic assignment.

According to an embodiment, the method is carried out in a document management system.

DESCRIPTION OF THE DRAWINGS

In the following, various embodiments of the invention will be described in more detail with reference to the appended drawings, in which

FIG. 6 shows an example of an apparatus according to an embodiment; and

FIG. 7 shows an example of a method according to an embodiment.

DESCRIPTION OF EXAMPLE EMBODIMENTS

In the following, several embodiments of the invention will be described in the context of document management system, i.e. generating and transmitting notifications in/from a document management system. Parallel terms for document management system are "content management system", "data management system", "enterprise content management system". An example of a document management system is M-Files® document management system. It is to be noted, however, that the invention is not limited to the document management system. In fact, the different embodiments have applications in any environment where automatic generation and transmission of notifications is required.

The document management system (DMS) refers to a file arrangement that stores objects being defined by metadata (i.e. properties). Such a system comprises various features for managing electronic documents, e.g. storing, versioning, indexing, searching for and retrieval of documents. It is appreciated that there are both dynamic and static document management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The observed location of the files is not constant, but may vary in a virtual space depending on the situation.

In this disclosure, the term "document" relates to a medium (a file) that has been created by a certain application and that has been associated with metadata. For example, a piece of text created by using the Microsoft Word application is a file. "Metadata" refers to information on a document's properties. For example, a creator of the file or a creation date may represent the metadata. The term "object"/ "electronic object" refers to a document, and is composed of the content of the object as well as of the metadata of the object. Documents and other metadata defined objects are located statically or virtually in the file arrangement. Virtual location is defined by giving a document location(s) based on its metadata, which then addresses the document into a certain virtual folder depending on the route the document is approached. Therefore the content of each folder depends on the current property values of objects and may vary according to a use case and is thus dynamic.

Figure 1:
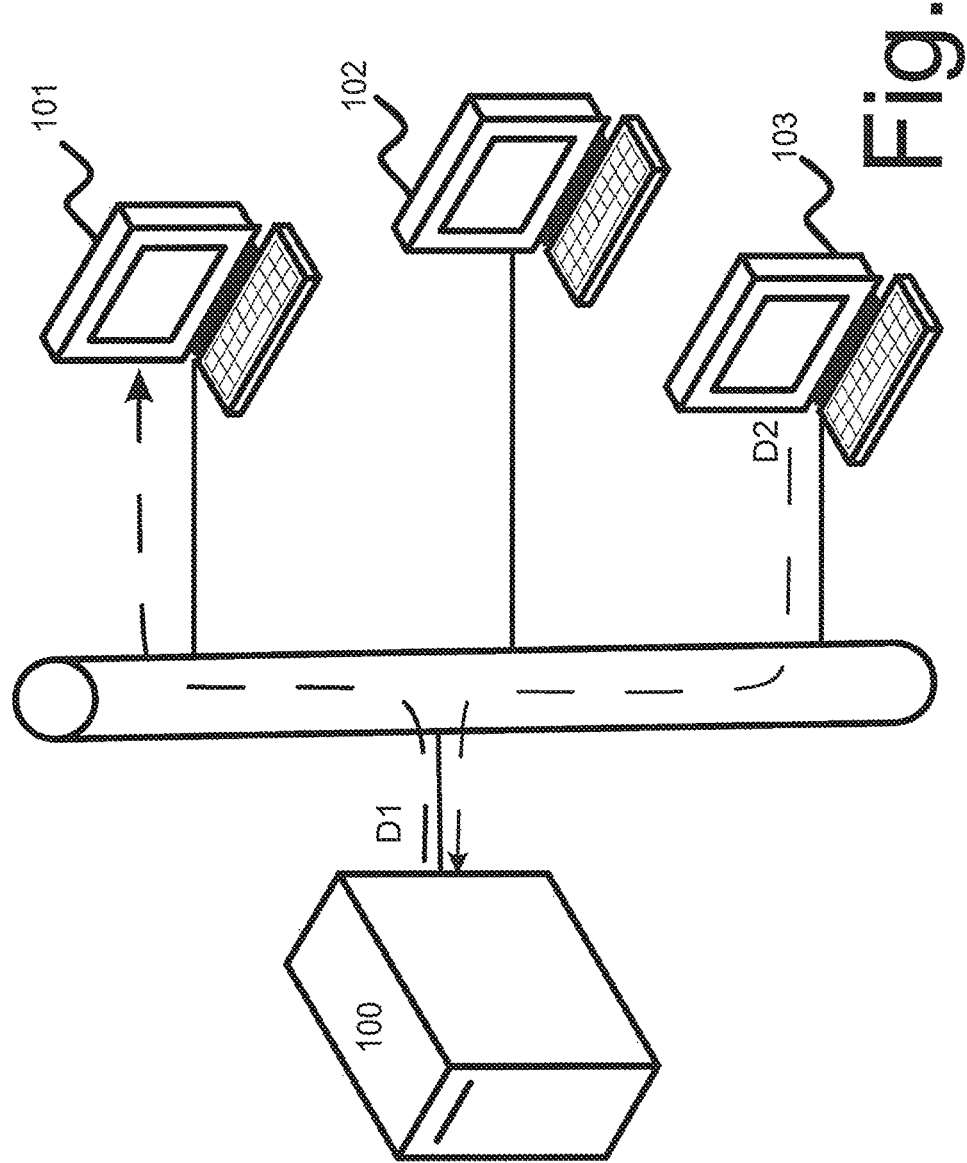
FIG. 1 shows a simplified example of a system configuration.

An example of a system configuration is illustrated in FIG. 1. This system configuration is a document management system that comprises a document management server 100 and client devices 101, 102, 103, which are interconnected. The interconnection can be wired or wireless and it may be substantially always on or it may be disconnected occasionally. The server 100 is configured to store objects (e.g. documents) that can be retrieved by the client devices 101, 102, 103. The server and client devices each typically includes at least one processor and at least one memory (computer readable medium) for storage of at least computer program code for execution by the at least one processor.

The client device can be any electronic device capable of computing, such as e.g. a personal computer, a laptop, a mobile device. Instead of the server 100, the document management system may comprise more than one servers, and at least one of these servers may be cloud-based server while the others are so called "on-premise servers".

As an example, in FIG. 1 document D1 is retrieved by client device 101, whereas document D2 is stored by the client device 103 to the document management server 100. The document management server 100 is configured mainly to store documents, but in use the document management server may have other functions as well, e.g. it controls access rights, registers modifications made to documents and allows connections to other systems. An electronic document stored in the document management system is an example of an object. Such an object is given metadata items (i.e. property values) e.g. a name of creator, a type of a document, a project which the document belongs to, a security class, a client etc.

As was mentioned, the document management system can be dynamic so that the folders are virtual, and the documents are virtually located in the folders depending on the user's viewpoint that builds on top of metadata. Documents can have more than one location in the dynamic document management system but the document as such is the same document throughout the locations. In other words, the document is stored into the document management system only once, but is given multiple locations based on its metadata items. The present embodiments can also be utilized in a file management system statically storing folders that comprises files Therefore, term "location" should be interpreted as both a physical and virtual location depending on the file arrangement to cover both dynamic document management system and file management system. However, in order to utilize the present solution, the objects (e.g. documents, folders) have to be associated with metadata. This means that each e.g. document has a property structure defining at least one piece of metadata (i.e. metadata item) for the document.

Figure 2:
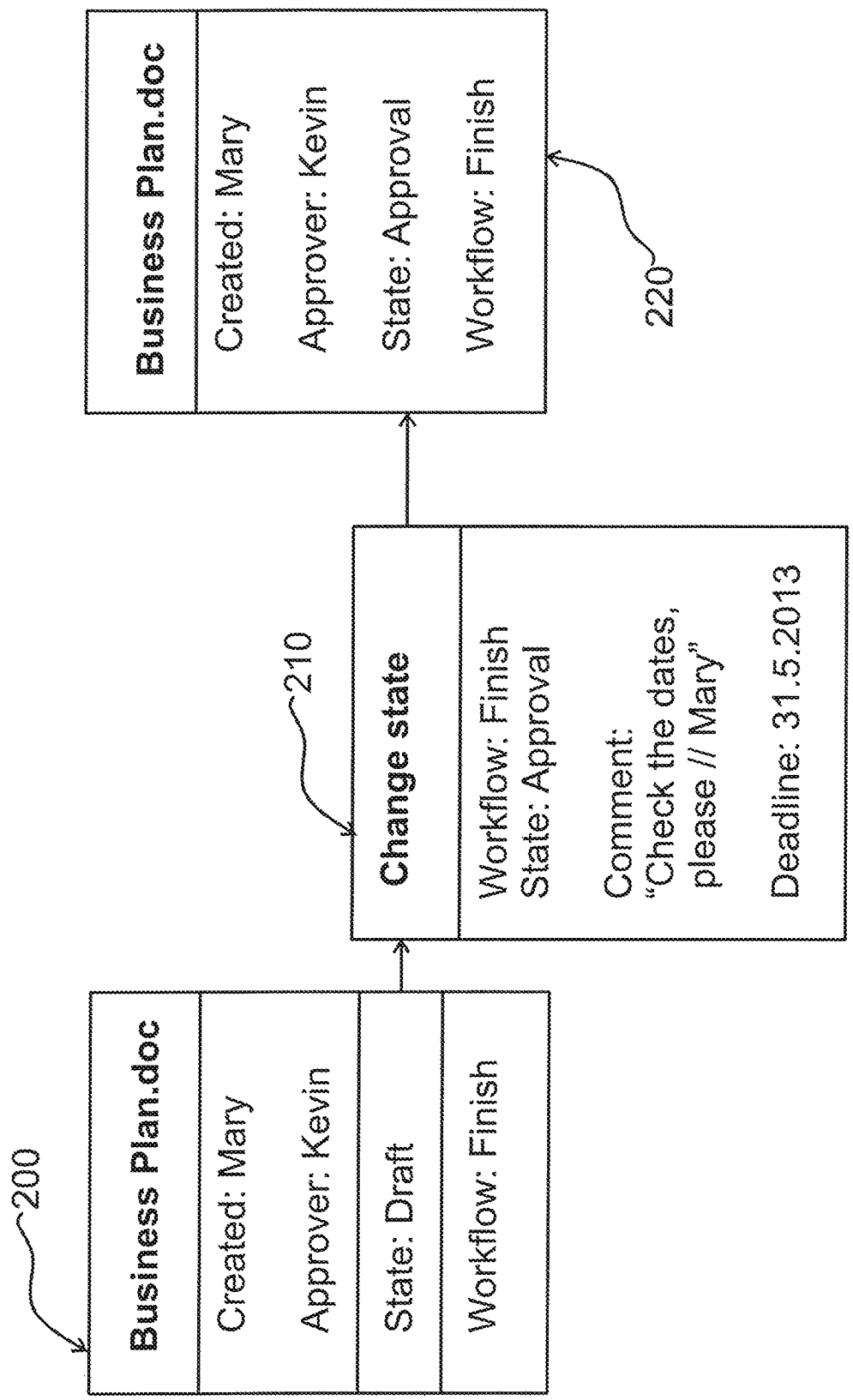
FIG. 2 shows an example of an electronic object having a state transition.

FIG. 2 illustrates an electronic object 200 called "Business Plan.doc" (later referred as "Business Plan") and being defined with metadata "Created: Mary; Approver: Kevin; State: Draft; Workflow: Finish", where "Created"; "Approver"; "State"; "Workflow" represent metadata's definition part (i.e. property definition), and "Mary"; "Kevin"; "Draft"; "Finish" represent metadata values respectively.

According to an embodiment, the state of the electronic object 200 can be changed via view 210, where state transition e.g. from "Draft" to "Approval" is performed. The user making the state transition can comment the state transition "Check the dates, please II Mary" and create a deadline for the operation, e.g. "31.5.2013". After the state transition, the object "Business Plan" has metadata 220, where property definition "State" has a property value "Approval".

Due to the state transition, a notification is automatically created, by means of which the user being assigned to do the approval is notified on the new state. It is realized from the metadata of the electronic object 200 that the approver is "Kevin". The notification is thus sent to Kevin according to the contact information relating to Kevin and being stored in the system.

The relevant user (i.e. the user to whom the notification is sent) may be determined from a value of another property, wherein said another property is associated with or indicated or pointed by the changed value (i.e. "Approval" in the previous example). The other property can be a property of the same object (direct reference) in which e.g. the state transition occurred, or the other property can be a property of another object (indirect reference). The association of the relevant properties to certain values of metadata properties can be implemented e.g. by a lookup table or a list.

This is described in more detailed manner by means of various embodiments, where the first embodiment relates to determining a user from a property of the same object (i.e. direct reference) and the second and the third embodiments relate to determining a user from a property of another object (i.e. indirect reference).

According to the first embodiment, which is based on a previous example, relevant user "Kevin" is determined from a metadata property "Approver", wherein the metadata property "Approver" is a property of the object, where the state transition occurred. The metadata property "Approver" associated with the changed value "Approval" of the metadata property "State". This can be implemented e.g. by a lookup table or a list storing values associated with other properties. A list or a lookup table can be as follows (please note that the state values and the relevant properties are selected for understanding purposes only, and therefore they should not be considered limiting for the present solution. The relevant properties and the values they have been associated with can vary in different applications and contexts):

TABLE 1

An example of associating values of a metadata property to direct properties from which a user is obtained

| State value | Relevant property, i.e. from which a user is obtained (Direct) |
|---|---|
| Approval | Approver |
| Finished | Created by |
| Posting | Assistant |
| Modified | Employee |

In the previous table, the value according to which a relevant user (i.e. user to whom a notification is to be sent) is determined relates to a property "workflow state". It is appreciated that any property with alternative values can be used instead. For example, if a value for a property "Document type" is changed from "Offer" to "Agreement", the user(s) to whom a notification is sent may be determined from a property "Person in Charge" of the object, which "Person in Charge" property has been associated with value "Agreement". As an another example, if a value for a property "Project" is changed from "Active" to "Passive", the user(s) to whom a notification is sent may be determined from a property "After sales", which has been associated with value "Passive". Thus, in this embodiment, the relevant user is determined from a property that is associated with or indicated by a (changed) value of another property.

According to a second embodiment, the user to whom the notification is sent may be determined from an indirect property, i.e. from a property of another object. In the second embodiment, the example of the other object is a version history that is referred to in the lookup table or a list associating relevant properties with changed values.

An example of such lookup table or list is shown below (please note that the state values and the relevant properties are selected for understanding purposes only, and therefore they should not be considered limiting for the present solution. The relevant properties and the values they have been associated with can vary in different applications and contexts):

TABLE 2

An example of associating values of a metadata property to indirect properties from which a user is obtained

| State value | Property from which user is obtained (Indirect) |
|---|---|
| Approval | Versionhistory.UserWhoMovedObjectToReadyForApproval |
| Finished | Project.ProjectManager |
| Posting | Team.Administrator |
| Modified | Versionhistory.UserWhoMOvedObjectToToBeModified |

In the previous table, the value according to which a relevant user (i.e. user to whom a notification is to be sent) is determined again relates to a property "workflow state". It is appreciated that any property with alternative values can be used instead. The associating properties are so called indirect properties, which means that they are originated from some other object than the one comprising the "workflow state" property. It is shown in the table that values "Approval" and "Modified" are associated with properties of object Version History. Version History is an object comprising data being gathered after each "Save" command of the object. This means that any operation that is to be confirmed with a "Save" command, creates an entry to the Version History object. Thus, the system is configured so that when the value of a certain property is changed, the notification is sent to a certain user who has previously affected the changed value.

For a state value "Approval", the determining property in the Version History object is "UserWhoMovedObjectToReadyForApproval". This means that the user, who has changed a value of the property "State" into a value "Ready For Approval" is the relevant user, i.e. the user to whom the notification is to be sent. Version History object stores such data as metadata for the Version History object.

As an example, when the value of the property "State" of the document is set to "Approved", the algorithm is triggered to find the user who has performed the setting of the property "State" to "Ready for approval". This can be implemented by the algorithm by collecting all document history versions, where the property "State" has a value "Ready for approval"; going through the collected versions starting from the newest version; and on each iteration, checking if the difference of two subsequent version numbers is more than one. If it is determined to be more than one, which means there is a gap between the two subsequent version numbers, it means that the value for the property "State" has been different between the these two versions. The latest change of a property "State" to "Ready for approval" must then be the version that has been created just after the gap. If no gap was found, it means that the oldest version in the collected set is the version where the value of the property "State" has been changed to "Ready for approval". The person that makes "Save command" to the version where "State" is changed to "Ready for approval", is the value for "UserWhoMovedObjectToReadyForApproval".

Thus, in this second embodiment, the method utilizes the document version metadata containing information on the users who have saved versions of the object whose "State" property is changed. Thus, such user is selected to be the recipient for the notification, and the notification is sent to that user.

In the second embodiment, the relevant user is determined to be a person who has affected to the property "State". However, the relevant user may be determined based on any metadata property whose value has been changed. This can also can be done by utilizing Version History. This means that when e.g. a value of a property "document type" is changed into "Agreement", a relevant person may be determined from the document's version history, e.g. a person who set the value of the property "document type" into "Agreement" or a person who set the value of the property "document type" into some other value, e.g. "Draft", if that is defined to be relevant for the notification in question.

According to a third embodiment, the relevant user is determined by using indirect properties of another object. However, in the third embodiment, the other object is not Version History, but any other object in the document system. Table 2 shows two example values for a property "State" being associated with properties of another object. Those values are "Finished" which is associated with a property "Project.ProjectManager", and "Posting" being associated with "Team.Administrator". Values for these indirect properties are found from an object that is defined before ".", i.e. object "Project" and object "Team" respectively. Both of these objects have their own sets of metadata with properties having values. For example, object "Project" has a property "Project Manager", whose value is defined to be the relevant user. Similarly, object "Team" has a property "Administrator", whose value is defined to be the relevant user.

In the previous example, various embodiments for determining a relevant user have been disclosed. These embodiments have in common a feature, where another property being associated to the second value (i.e. the changed value) is used for determining a relevant user to whom a notification is sent. The other property can be a property of the same object or of another object.

Figure 3:
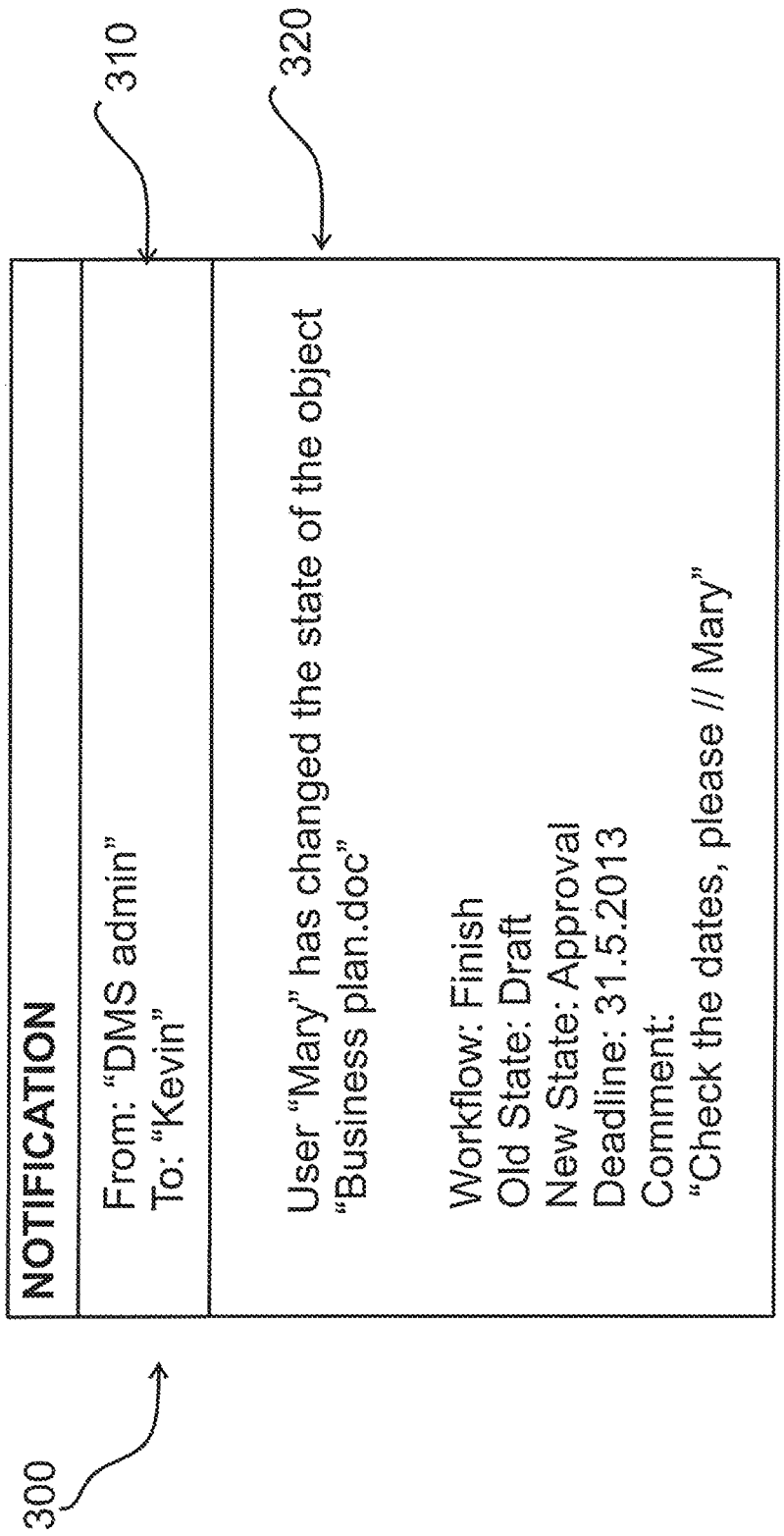
FIG. 3 shows an example of a notification being automatically generated of data that is directly related to the object.

FIG. 3 is an example of the notification 300. As said, the notification is automatically generated by the document management system after the state transition. In this example, the sender of the notification 300 is marked to be "DMS admin", because the notification is sent from the document management system. However, in some other examples, the sender can be e.g. the user "Mary". The content of the notification 300 is shown with reference 320. The template of the notification contains fields, i.e. placeholders, that are named as "Workflow"; "Old State"; "New State"; "Deadline"; "Comment". The placeholders are filled during the automatic notification generation with property values concerning the electronic object "Business Plan", i.e. "Finish"; "Draft"; "Approval"; "31.5.2013"; "Check the dates, please !! Mary" respectively. Thus, term "placeholder" defines a fill-in field in a message (i.e. a notification) template that is filled automatically with data obtained from a metadata of an electronic object in question. It is appreciated that the content of the placeholder varies depending on the electronic object, on the property values, on the state etc.

The notification may be sent to relevant user, e.g. "Kevin" of the previous example, by means of an email or any other electronic messaging system (e.g. short messaging service, instant message).

According to an embodiment of the present invention, the placeholders may be also be filled with data that is not directly obtained from a metadata of the electronic object in question (as in the examples of FIG. 3) but the data inserted to the placeholders is obtained from a metadata that is indirectly related to the electronic object.

Yet in other words, the data to be put to the placeholders is obtained from metadata of an object that is referred by metadata of the object. To put it more precisely, the data for the placeholder is a value of a metadata of an object that is referred by a value of a metadata of the object in question (e.g. "Business plan"). It is appreciated that the chain of references can be longer than in the previous example, i.e. a value of a metadata of an object referred by a value of a metadata of an object referred by a value of a metadata of an object referred by a value . . . of the object in question. This is illustrated by means of an example in FIG. 4. Electronic object "Business Plan" 450 has a metadata "Client" having value "Wshop LTD" 400. This metadata value "Wshop LTD" acts as a reference to an electronic object "Wshop LTD" 451 having metadata "Project" with value "Store" 410. Again, the metadata value "Store" acts as a reference to an electronic object "Store" 452, having metadata "Manager" with value "John".

Figure 5:
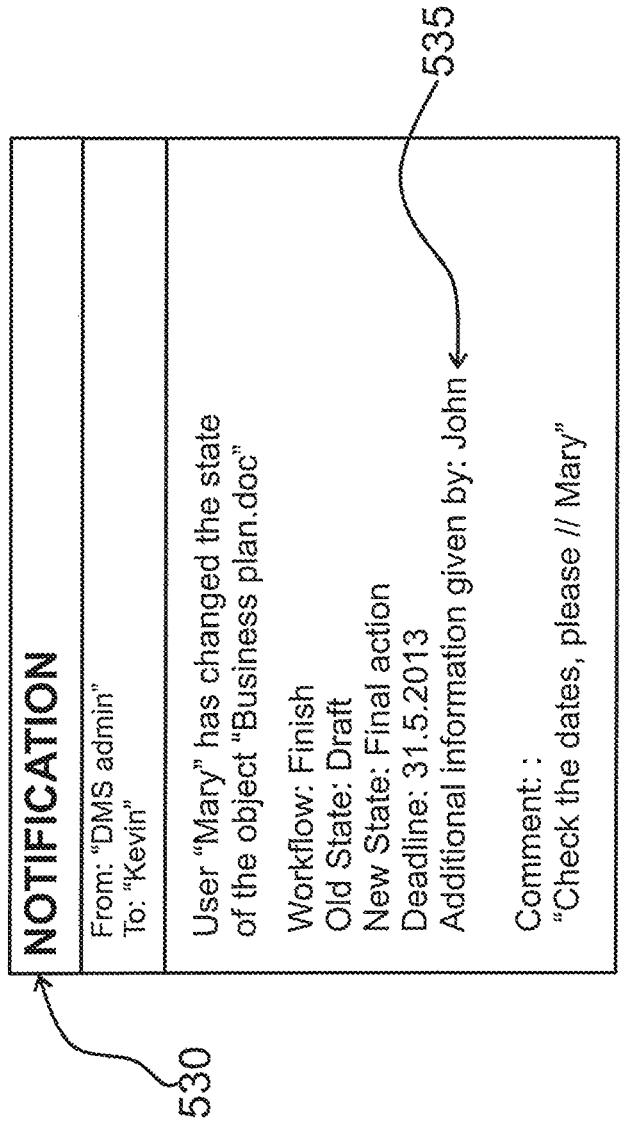
FIG. 5 shows an example of a notification according to an embodiment.

When a state of the electronic object "Business Plan" 450 is changed from "Draft" to "Final action", the property value "John" in electronic object "Store" 452 can be automatically obtained to the generated notification concerning the state transition of "Business Plan" 450, e.g. to a placeholder "Additional information is given by "John"", where "John" is an indirect fill-in data to the placeholder. FIG. 5 illustrates a notification 530 according to an embodiment, wherein the notification 530 has a placeholder 535 having indirectly related content.

To enable indirect obtaining of metadata values, the document management system's notification generation is configured as follows: At first a notification template is obtained. The notification template may have a template text and place-holders for variables, i.e. for fill-in data. There can be several notification templates, each having different template text, e.g. a notification template for each state transition in a workflow. The template text and placeholders may be defined by an administrator through an administrator user interface. The place holders may be defined with a dot-notation. According to examples shown in FIGS. 4 and 5, in a notification template for notification 530, the template text may be as follows:

User [placeholder] has changed the state of the object [placeholder].
    Workflow: [placeholder]
    Old state: [placeholder]
    New State: [placeholder]
    Deadline: [placeholder]
    Additional information given by: [placeholder]
    Comment [placeholder]

Figure 4:
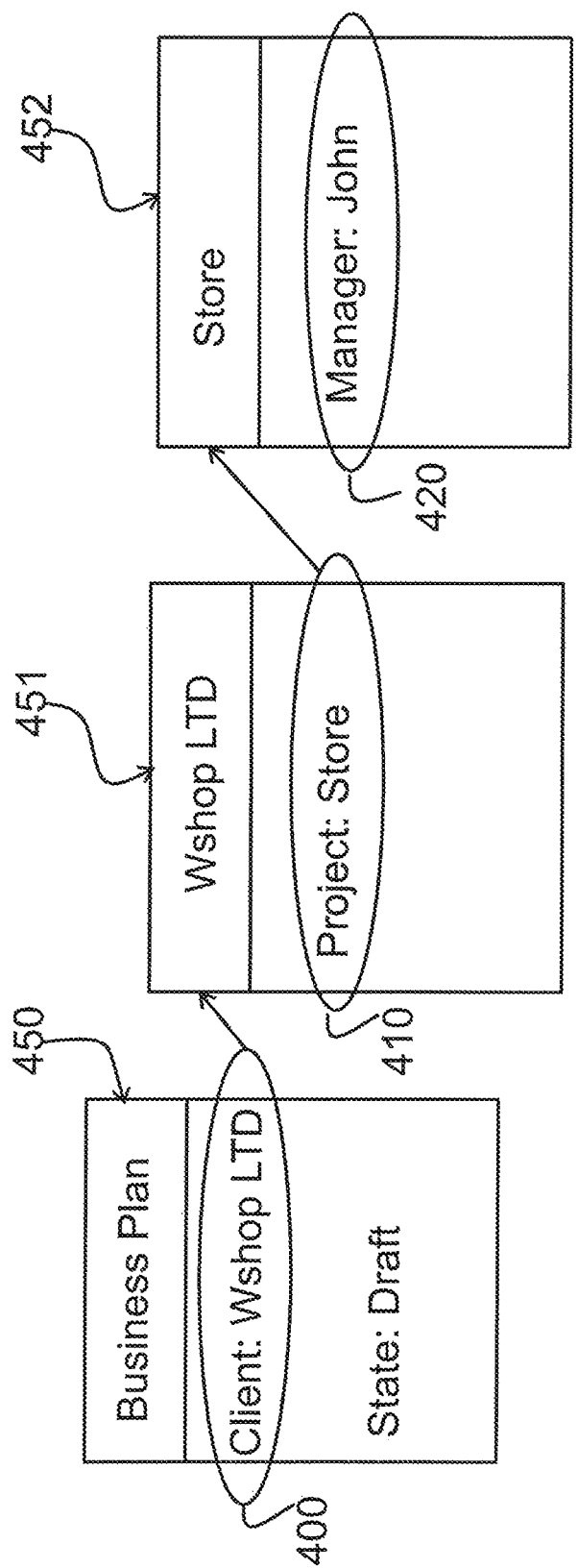
FIG. 4 shows an example of a chain of references between electronic objects.

Yet further, for defining the content for the placeholders, the notification template is as follows:

User [.user] has changed the state of the object [.title].
    Workflow: [.workflow]
    Old state: [.old state]
    New State: [.new state]
    Deadline: [.deadline]
    Additional information given by: [client.project.manager]
    Comment [.comment]

where ".user", ".title", ".workflow", ".old state", ".new state", ".deadline" and ".comment" are direct metadata values of the document "Business Plan.doc" taken from corresponding metadata items. However, "client.project.manager" defines an indirect metadata value, that is to be included into the notification. As shown in FIG. 4, the indirect metadata value is "John", because client-project-manager metadata value chain being started from a document in question, i.e. Business Plan.doc, ends up to a value "John".

FIG. 6 illustrates an example of an apparatus 600, e.g. a server. The apparatus 600 comprises a processor 690 (Central Processing Unit, CPU) for processing data and a memory 670 that may store applications and various data etc. The server also comprises computer program code 675 residing in the memory 670. The memory 670 may be, but is not limited to, a single memory, CD, DVD, ROM, RAM, EEPROM, optical storage, or any other non-volatile storage medium capable of storing digital data.

The apparatus 600 comprises also a control unit 630 for controlling functions in the apparatus 600. The control unit 630 (MCU, Main Control Unit) may comprise one or more processors. The control unit 630 may run a user interface software to facilitate user control of at least some functions of the apparatus 600. The control unit 630 may also deliver a display command and a switch command to a display 640 to display visual information, e.g. a user interface.

The apparatus may also be connected to a keypad 650 for receiving input from the user. The control unit 630 may also communicate with the processor 690 and can access the memory 670. Yet further, the server may comprise various communication means 620, 680 having a transmitter and a receiver for connecting to the network and for sending and receiving information. The first communicating means 620 can be adapted for telecommunication and the other communicating means 680 can be a one kind of short-range communicating means, such as Bluetooth™ system, WLAN system (Wireless Local Area Network) or other system which suits for local use and for communicating with another device.

An example of a method is illustrated with simplified flowchart in FIG. 7. At first a notifiable operation concerning an electronic object is detected. A notifiable operation is such that it needs to be informed to relevant users in order to keep the object in process. Examples of a notifiable operations are a new object in a workflow, a state transition of an object, a new assignment concerning the object, check-out of a document, check-in of a document, undo a modification, finishing an asynchronic downloading of a file, a certain time from a certain operation has elapsed, change of a referenced-to file of a document, etc. It is thus appreciated that any situation, where automatic notifications can be generated could be provided as an example. Once the notifiable operation has been detected, the system is configured to automatically generate a notification that relates to the detected operation. In the automatic notification generation, a notification template is completed with data that is obtained from a metadata of an/the electronic object. The data can be obtained by means of e.g. dot-notation being used in the placeholders. At least one piece of such data is a metadata value that is associated with an electronic object that is a target of an indirect reference chain, which chain starts from the electronic object in question (see the example of FIG. 4). The method further comprises sending the notification to a relevant user. The relevant user is defined by determining another property that is associated with the notifiable operation, e.g. a changed value of a metadata property, wherein the another property is a property of the first electronic object or of a second electronic object; and obtaining a value of said another property, wherein the relevant user is defined by the value of said another property.

The various embodiments of the invention can be implemented with the help of computer program code that resides in a memory and causes the relevant apparatuses to carry out the invention. For example, a client device may comprise circuitry and electronics for handling, receiving and transmitting data, computer program code in a memory, and a processor that, when running the computer program code, causes the device to carry out the features of an embodiment.

Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

What is claimed is:

1. A method in a content management system storing electronic objects being associated with metadata, wherein metadata comprises a set of properties, each property having one or more metadata values, the method comprising:
   detecting a notifiable operation concerning a first electronic object, wherein the notifiable operation relates to a change of a metadata value from a first value to a second value in a metadata property of the first electronic object;
   obtaining a notification template that corresponds to the detected notifiable operation, the notification template comprising at least one field for fill-in data;
   automatically generating a notification by determining said fill-in data from a metadata value of an electronic object; and filling said at least one field of a notification template with the determined fill-in data;
   determining another metadata property by examining a list which associates other metadata properties with specific changes in metadata properties of the first electronic object, the another metadata property being a property of the first electronic object or of a second electronic object;
   obtaining a value of said another metadata property;
   defining a relevant user by the value of said another metadata property, said another metadata property being associated with the second value of the metadata property of the first electronic object; and
   sending electronically the generated notification to the relevant user.

2. The method according to claim 1, wherein the notifiable operation is an operation that needs to be informed to the relevant user in order to keep the first electronic object in process.

3. The method according to claim 1, wherein the notifiable operation is one of the following: a new first electronic object in a workflow, a state transition of the first electronic object, and a new assignment concerning the first electronic object.

4. The method according to claim 1, wherein said another metadata property is determined from the metadata of such another electronic object that is a target of an indirect reference chain, which chain starts from the first electronic object in question.

5. The method according to claim 1, comprises transmitting the notification by means of any of the following methods: email, short messaging, instant messaging, and an electronic assignment.

6. The method according to claim 1, further comprising filling at least one other field of the notification template with data that is originated from a metadata value of the first electronic object.

7. The method according to claim 1, further comprising determining said fill-in data from a metadata value of an electronic object that is a target of an indirect reference chain, which chain starts from the first electronic object.

8. The method according to claim 1, further comprising determining another property from a lookup table or a list associating second values and corresponding other properties.

9. The method according to claim 1, wherein said another property is a property of a version history of the first electronic object.

10. An apparatus for a content management system storing electronic objects being associated with metadata, wherein metadata comprises one or more metadata values, the apparatus comprising at least one processor, memory including computer program code, the memory and the computer program code configured to, with the at least one processor, cause the apparatus to perform at least the following:

- detect a notifiable operation concerning a first electronic object, wherein the notifiable operation relates to a change of a metadata value from a first value to a second value in a metadata property of the first electronic object;
- obtain a notification template that corresponds to the detected notifiable operation, the notification template comprising at least one field for fill-in data;
- automatically generate a notification by determining said fill-in data from a metadata value of an electronic object; and filling said at least one field of a notification template with the determined fill-in data;
- determine another metadata property by examining a list which associates other metadata properties with specific changes in metadata properties of the first electronic object, the another property being a metadata property of the first electronic object or of a second electronic object;
- define a relevant user by the value of said another metadata property, said another metadata property being associated with the second value of the metadata property of the first electronic object; and
- send electronically the generated notification to the relevant user.

11. The apparatus according to claim 10, wherein the notifiable operation is an operation that needs to be informed to the user in order to keep the first electronic object in process.

12. The apparatus according to claim 10, wherein the notifiable operation is one of the following: a new first electronic object in a workflow, a state transition of the first electronic object, and a new assignment concerning the first electronic object.

13. The apparatus according to claim 10, wherein said another metadata property is determined from the metadata of such another electronic object that is target of an indirect reference chain, which chain starts from the first electronic object in question.

14. The apparatus according to claim 10, further comprising code configured to cause the apparatus to send the notification by means of any of the following methods: email, short messaging, instant messaging, and an electronic assignment.

15. The apparatus according to claim 10, further comprising code configured to cause the apparatus to fill at least one other field of the notification template with data that is originated from a metadata value of the first electronic object.

16. The apparatus according to claim 10, further comprising determining another property from a lookup table or a list associating second values and corresponding other properties.

17. The apparatus according to claim 10, wherein said another property is a property of a version history of the first electronic object.

18. A computer program product for a content management system storing electronic objects being associated with metadata, wherein metadata comprises one or more metadata values, the computer program product being embodied on a non-transitory computer readable medium, comprising computer program code configured to, when executed on at least one processor, cause an apparatus or a system to:

- detect a notifiable operation concerning a first electronic object, wherein the notifiable operation relates to a change of a metadata value from a first value to a second value in a metadata property of the first electronic object;
- obtain a notification template that corresponds to the detected notifiable operation, the notification template comprising at least one field for fill-in data;
- automatically generate a notification by determining said fill-in data from a metadata value of an electronic object; and filling said at least one field of a notification template with the determined fill-in data;
- determine another metadata property by examining a list which associates other metadata properties with specific changes in metadata properties of the first electronic object, the another property being a metadata property of the first electronic object or of a second electronic object;
- obtain a value of said another metadata property;
- define a relevant user by the value of said another metadata property, said another metadata property being associated with the second value of the metadata property of the first electronic object; and
- send electronically the generated notification to the relevant user.

* * * * *